(12) United States Patent
Kim

(10) Patent No.: US 8,787,983 B2
(45) Date of Patent: Jul. 22, 2014

(54) MOBILE TERMINAL AND CONTROL METHOD THEREOF

(75) Inventor: Jonghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/553,598

(22) Filed: Jul. 19, 2012

(65) Prior Publication Data

US 2013/0072263 A1    Mar. 21, 2013

(30) Foreign Application Priority Data

Sep. 15, 2011    (KR) .......................... 10-2011-0092733

(51) Int. Cl.
*H04M 1/00*    (2006.01)
*G06F 3/0481*    (2013.01)
*G06F 3/0486*    (2013.01)
*G06F 3/0488*    (2013.01)

(52) U.S. Cl.
CPC ............ *G06F 3/0481* (2013.01); *G06F 3/0486* (2013.01); *G06F 3/0488* (2013.01); *G06F 3/04886* (2013.01)
USPC .......................................... 455/566; 455/418

(58) Field of Classification Search
CPC ... G06F 3/0481; G06F 3/0486; G06F 3/0488; G06F 3/04886
USPC ........... 455/566, 418; 715/778, 781, 804, 864
See application file for complete search history.

(56) References Cited

U.S. PATENT DOCUMENTS

| | | | | |
|---|---|---|---|---|
| 5,841,435 A | * | 11/1998 | Dauerer et al. | 715/775 |
| 6,710,788 B1 | * | 3/2004 | Freach et al. | 715/778 |
| 7,010,755 B2 | * | 3/2006 | Anderson et al. | 715/778 |
| 7,380,024 B2 | * | 5/2008 | Peterson et al. | 709/250 |
| 2003/0179240 A1 | * | 9/2003 | Gest | 345/779 |
| 2005/0143124 A1 | | 6/2005 | Kennedy et al. | |
| 2009/0064055 A1 | * | 3/2009 | Chaudhri et al. | 715/863 |
| 2009/0224867 A1 | | 9/2009 | O'Shaughnessy et al. | |
| 2010/0011291 A1 | * | 1/2010 | Nurmi | 715/702 |
| 2010/0056223 A1 | * | 3/2010 | Choi et al. | 455/566 |
| 2011/0144970 A1 | * | 6/2011 | Jiang et al. | 703/24 |
| 2012/0165075 A1 | * | 6/2012 | Kim et al. | 455/566 |
| 2012/0165076 A1 | * | 6/2012 | Yu et al. | 455/566 |
| 2012/0265955 A1 | * | 10/2012 | Kawabe et al. | 711/162 |

FOREIGN PATENT DOCUMENTS

| | | |
|---|---|---|
| CN | 101021765 | 8/2007 |
| CN | 101916143 | 12/2010 |
| EP | 1223728 | 11/2003 |

OTHER PUBLICATIONS

The State Intellectual Property Office of the People's Republic of China Application Serial No. 201210336981.8, Office Action dated Feb. 11, 2014, 8 pages.

* cited by examiner

*Primary Examiner* — Duc M Nguyen
(74) *Attorney, Agent, or Firm* — Lee, Hong, Degerman, Kang & Waimey

(57) ABSTRACT

A mobile terminal and a method of controlling the mobile terminal are provided. The mobile terminal includes a display configured to display a display area including one or more items, and a controller configured to set one or more virtual areas adjacent to the display area, wherein the one or more virtual areas have different attributes from an attribute of the display area, and configured to change and display at least one item selected from the one or more items depending on an attribute of at least one virtual area of the one or more virtual areas.

26 Claims, 32 Drawing Sheets

(a)

(b)

(a)

(b)

(a)

(b)

(c)

(d)

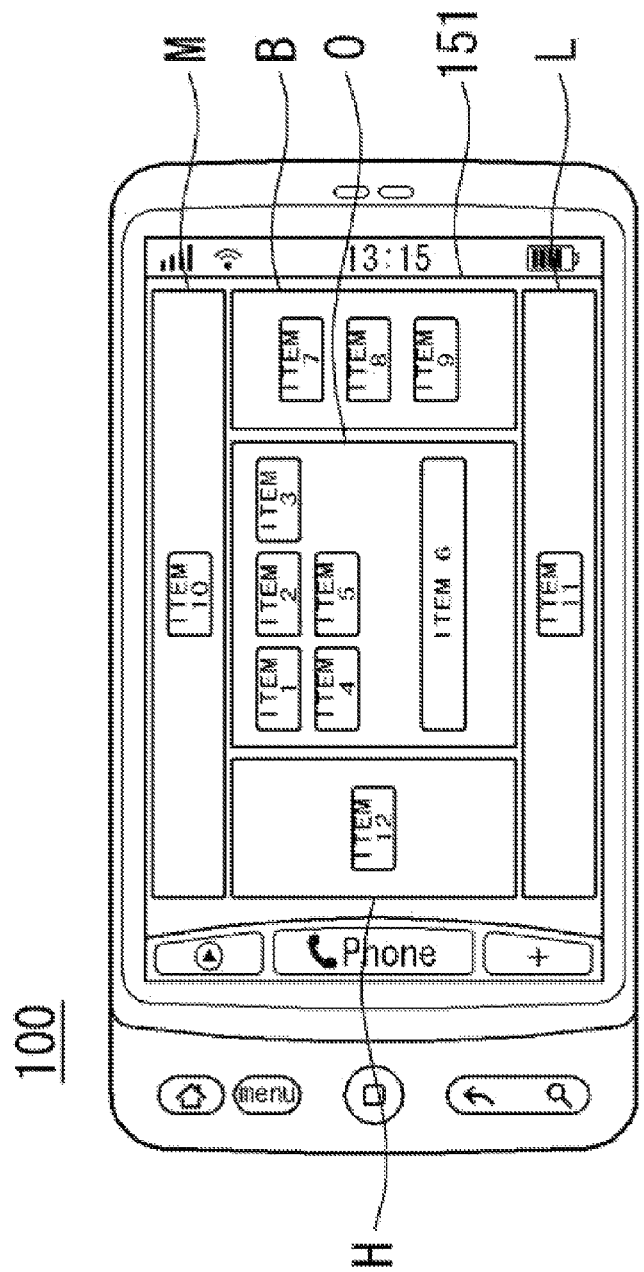

(a)

(b)

(a)

(b)

(a)

(b)

(a)

(b)

MOBILE TERMINAL AND CONTROL METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2011-0092733, filed on Sep. 15, 2011, the contents of which are incorporated by reference herein in their entirety.

TECHNICAL FIELD

The embodiments of the present invention are directed to a mobile terminal and a method of controlling the mobile terminal, and more specifically to a mobile terminal and a method of controlling the mobile terminal, which can set a virtual area adjacent to a display area and control an item selected according to an attribute of the virtual area.

DISCUSSION OF THE RELATED ART

As functions of terminals such as personal computers, laptop computers, cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable.

SUMMARY

The embodiments of the present invention are directed to a mobile terminal and a method of controlling the mobile terminal, and more specifically to a mobile terminal and a method of controlling the mobile terminal, which can set a virtual area adjacent to a display area and control an item selected according to an attribute of the virtual area.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIGS. 12A to 12C are views illustrating arrangements of virtual areas as the mobile terminal shown in FIG. 1 rotates;

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
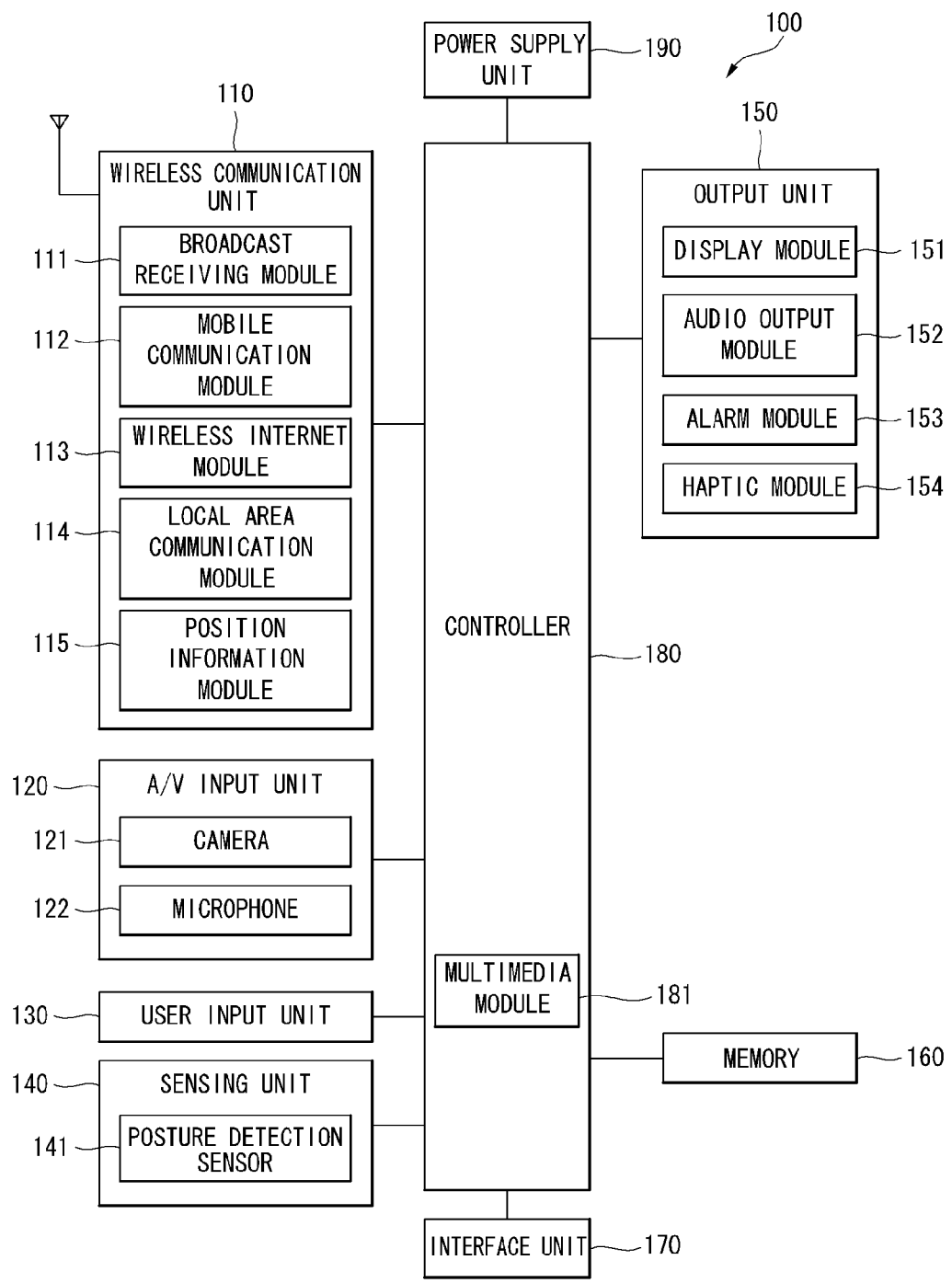
FIG. 1 is a block diagram of a mobile terminal according to an embodiment of the present invention.

FIG. 1 is a block diagram of a mobile terminal 100 according to an embodiment of the present invention. Other embodiments, configurations and arrangements may also be provided. As shown, the mobile terminal 100 may include a radio communication unit 110, an audio/video (A/V) input unit 120, a user input unit 130, a sensing unit 140, an output unit 150, a memory 160, an interface 170, a controller 180, and a power supply 190. Not all of the components shown in FIG. 1 may be essential parts and the number of components included in the mobile terminal 100 may be varied. The components of the mobile terminal 100 will now be described.

The radio communication unit 110 may include at least one module that enables radio communication between the mobile terminal 100 and a radio communication system or between the mobile terminal 100 and a network in which the mobile terminal 100 is located. For example, the radio communication unit 110 may include a broadcasting receiving module 111, a mobile communication module 112, a wireless Internet module 113, a local area communication module 114, and a location (or position) information module 115.

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The local area communication module 114 may correspond to a module for local area communication. Further, Bluetooth®, radio frequency identification (RFID), infrared data association (IrDA), ultra wideband (UWB) and/or Zig-Bee® may be used as a local area communication technique.

The location information module 115 may confirm or obtain the position of the mobile terminal 100. The position information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan among others.

A global positioning system (GPS) module is a representative example of the location information module 115. The GPS module 115 may calculate information on distances between one point or object and at least three satellites and information on a time when the distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. In addition, the GPS module 115 may continuously calculate the current position in real time and calculate velocity information using the location or position information.

As shown in FIG. 1, the A/V input unit 120 may input an audio signal or a video signal and include a camera 121 and a microphone 122. The camera 121 may process image frames of still images or moving images obtained by an image sensor in a video telephony mode or a photographing mode. The processed image frames may be displayed on a display 151 which may be a touch screen.

The image frames processed by the camera 121 may be stored in the memory 160 or may be transmitted to an external device through the radio communication unit 110. The mobile terminal 100 may also include at least two cameras 121.

The microphone 122 may receive an external audio signal in a call mode, a recording mode or a speech recognition mode and process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and generate a sensing signal for controlling operation of the mobile terminal 100. For example, in case of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a posture detection sensor 141.

The output unit 150 may generate visual, auditory and/or tactile output and may include the display 151, an audio output module 152, an alarm 153 and a haptic module 154. The display 151 may display information processed by the mobile terminal 100. The display 151 may display a user interface (UI) or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

In addition, the display 151 may include at least one of a liquid crystal display, a thin film transistor liquid crystal display, an organic light-emitting diode display, a flexible display and a three-dimensional display. Some of these displays may be of a transparent type or a light transmissive type. That is, the display 151 may include a transparent display.

The transparent display may include a transparent liquid crystal display. The rear structure of the display 151 may also be of a light transmissive type. Accordingly, a user may see an object located behind the body of the mobile terminal 100 through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

Further, when the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 of the sensing unit 140 may be located in an internal region of the mobile terminal 100, surrounded by the touch screen, or near the touch screen. The proximity sensor 141 may sense an object approaching a predetermined sensing face or an object located near the proximity sensor using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of convenience of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the radio communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and the like. The audio output module 152 may output sounds through an earphone jack. The user may hear the sounds by connecting an earphone to the earphone jack.

The alarm 153 may output a signal for indicating generation of an event of the mobile terminal 100. For example, alarms may be generated when receiving a call signal, receiving a message, inputting a key signal, or inputting touch. The alarm 153 may also output signals in forms different from video signals or audio signals, for example, a signal for indicating generation of an event through vibration. The video signals or the audio signals may also be output through the display 151 or the audio output module 152.

The haptic module 154 may generate various haptic effects that the user can feel. One example of the haptic effects is vibration. The intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operation of the controller 180 and temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk or an optical disk. The mobile terminal 100 may also operate in relation to a web storage performing the storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and a universal subscriber identify module (USIM). An identification device including the user identification module may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 as shown in FIG. 1 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments of the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented by the controller 180.

According to software implementation, embodiments such as procedures or functions may be implemented with a separate software module executing at least one function or operation. Software codes may be implemented according to a software application written in an appropriate software language. The software codes may be stored in the memory 160 and executed by the controller 180.

Figure 2:
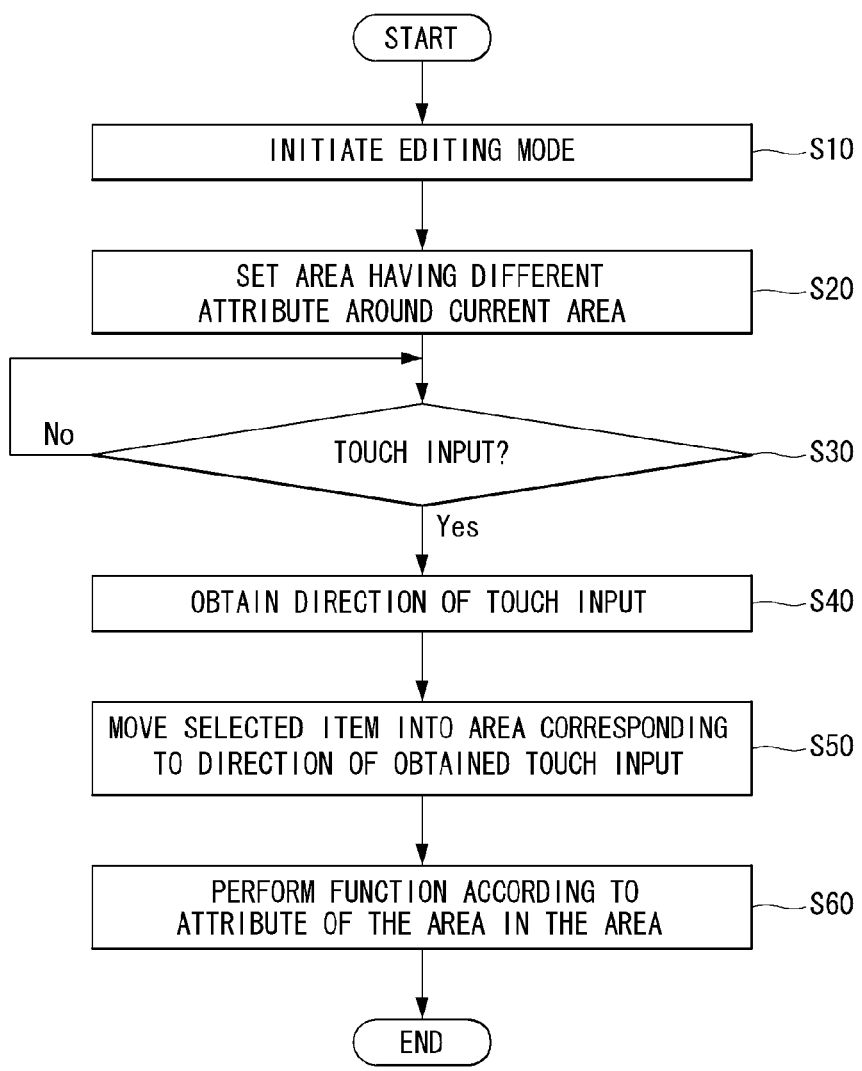
FIG. 2 is a flowchart illustrating an operation of the mobile terminal shown in FIG. 1.

FIG. 2 is a flowchart illustrating an operation of the mobile terminal shown in FIG. 1.

Referring to FIG. 2, the controller 180 of the mobile terminal 100 may perform a step of initiating an editing mode (S10).

The editing mode may refer to a state in which a user of the mobile terminal 100 may use a virtual area according to an embodiment. For example, for the same touch operation, general functions are configured to be performed before the editing mode, while under the editing mode unique functions for the editing mode are configured to be performed. A virtual area set when the editing mode is activated will be specifically described in relevant part below.

When the editing mode is initiated, there may be initiated a step of setting a first area having a different attribute from an attribute of a second area at a periphery of the second area (S20).

The controller 180, in the editing mode, may set at least one area having a different attribute from an attribute of a current display screen at a periphery of the display screen. The set area may be divided into a plurality of sub areas which have different attributes from each other. Unless otherwise stated, the set area is referred to as a "virtual area".

When a touch input is present (S30), a step of obtaining a direction of the touch input is performed (S40).

The virtual area may be located at, at least, one of upper, lower, left, and right sides of the current screen. Accordingly, it may be needed to obtain not only a touch operation of selecting a specific item but also a direction of a touch stroke included in the touch operation.

A step S50 may be performed to move a selected item to an area corresponding to the obtained direction of the touch input.

The item may be selected upon a user's entry of a touch down operation. For example, when an upper portion of an item displayed at a specific location, the touch item may be selected.

When the item is selected by the touch down operation, the user may perform an operation of dragging the item along a specific direction. For example, after selecting an item located at a center of the screen by a touch down operation, a user may drag the item to an upper portion of the display 151.

When performing the touch operation of dragging the item to the upper portion of the display 151, the controller 180 may determine that the user intended to move the item into the virtual area located at the upper portion. For example, in the case that a buffer area exists at the upper portion of the display 151, the controller 180 may determine that there was a touch operation of moving the selected item into the buffer area.

In the moved area, a function depending on an attribute of the area may be performed (S60).

The moved area may be any one of virtual areas outside a display area of the display 151. As described above, the virtual areas may have different attributes from an attribute of the current display area. Further, the virtual areas may have different attributes from each other.

The controller 180 may perform a function corresponding to an attribute of a virtual area into which the item has been moved. For example, when the item is moved into a buffer area, the controller 180 may perform an operation of temporarily storing the item until a subsequent operation is entered.

FIGS. 3A and 3B illustrate an example of initiating an editing mode as described in connection with FIG. 2.

Figure 3:
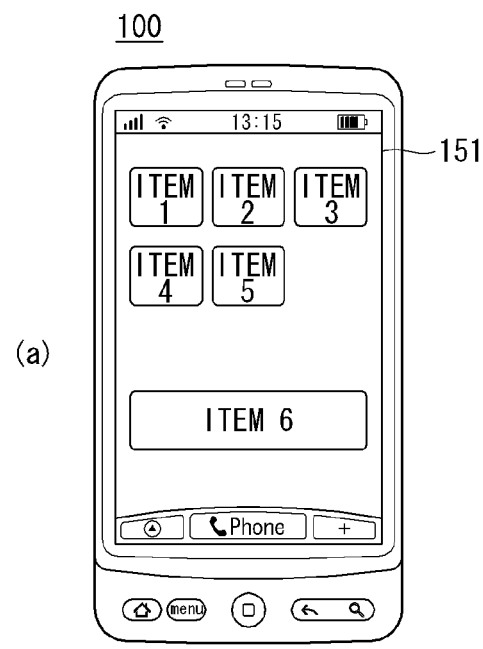
FIGS. 3A and 3B illustrate an example of initiating an editing mode as described in connection with FIG. 2.
Figure 3:
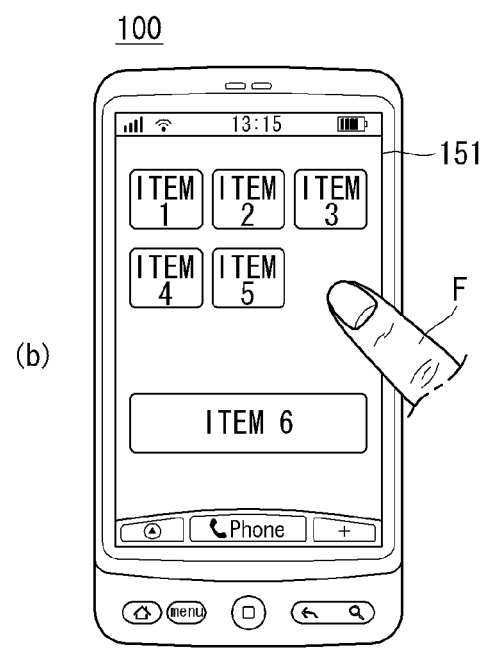

Referring to FIG. 3, the controller 180 of the mobile terminal 100 may perform an editing mode that may operate a function associated with a virtual area upon a predetermined entry.

As shown in FIG. 3A, the display 151 may display various items.

The items may be icons. The icons may correspond to predetermined applications, respectively. For example, when a certain icon is selected, an application corresponding to the selected icon may be performed.

The items may be widgets. For example, the items may be icons that may display states of the mobile terminal 100 and/or obtained data. For example, when messages are received, the number of the messages may be displayed on a widget.

The items may be contents. Each item may be an image file, a video file, and a sound file. In the case that an item is an image file, when a user selects the item, the image may be displayed on the entire screen of the display 151.

As shown in FIG. 3B, a user may perform a long touch on a predetermined point on the display 151 using his finger F. When the long touch is performed on the predetermined point, the controller 180 may initiate the editing mode. For example, it may be preset that when keeping a touch on a space without the items for a predetermined time, the editing mode is initiated.

Figure 4:
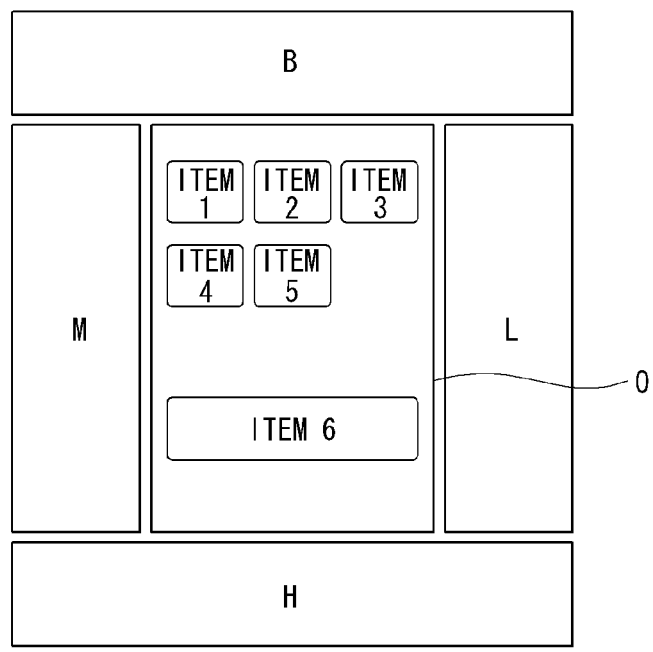
FIG. 4 is a view illustrating an exemplary virtual area of the mobile terminal shown in FIG. 1.

FIG. 4 is a view illustrating an exemplary virtual area of the mobile terminal shown in FIG. 1.

Referring to FIG. 4, the controller 180 of the mobile terminal 100 may set virtual areas surrounding a current screen area O.

The current screen area O may be an area that is displayed on the display 151 until entry into an editing mode. The current screen area O may display contents that have been displayed upon entry of the editing mode.

The controller 180 may display virtual areas surrounding the current screen area O. The virtual areas include a buffer area B, a management area M, a lock screen area L, and a hidden area H. The buffer area B, the management area M, the lock screen area L, and the hidden area H may be respectively positioned at an upper portion, a left portion, a right portion, and a lower portion of the current screen area O.

The virtual areas may be conceptually positioned at those locations. For example, simultaneously with entry into the editing mode, the virtual areas may not be displayed on the display 151. For example, as described above, when entry into the editing mode is made by performing a long touch on a specific point of the display 151, the screen changes to display the virtual areas including the buffer area B on the display 151 while keeping the screen displayed as is. For example, despite the entry into the editing mode, the buffer area B, the management area M, the lock screen area L, and the hidden area H may not be explicitly displayed on the display 151.

Figure 5:
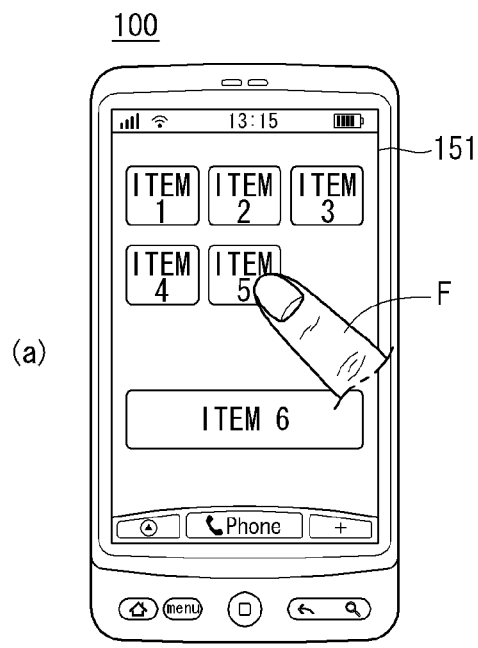
FIGS. 5 to 7 are views illustrating examples of using virtual areas of the mobile terminal as shown in FIG. 1.
Figure 5:
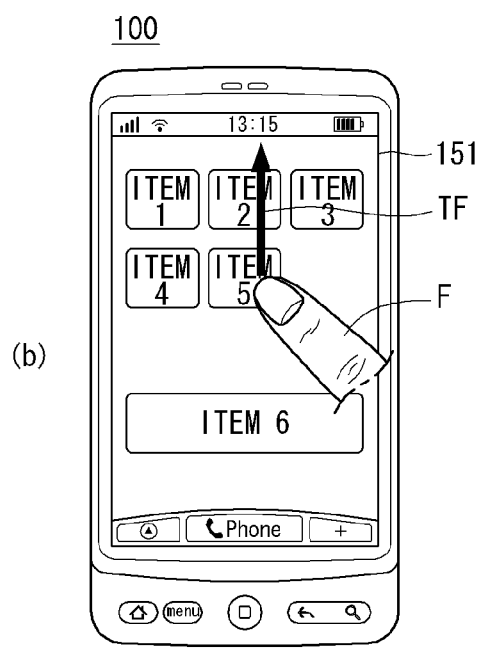
Figure 6:
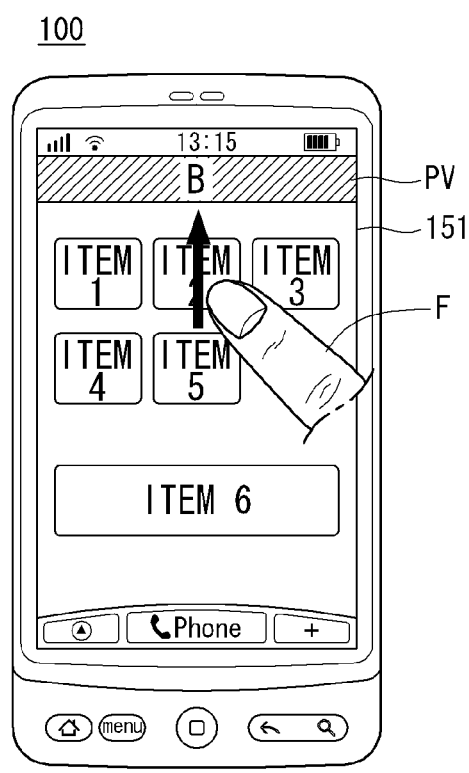
Figure 7:
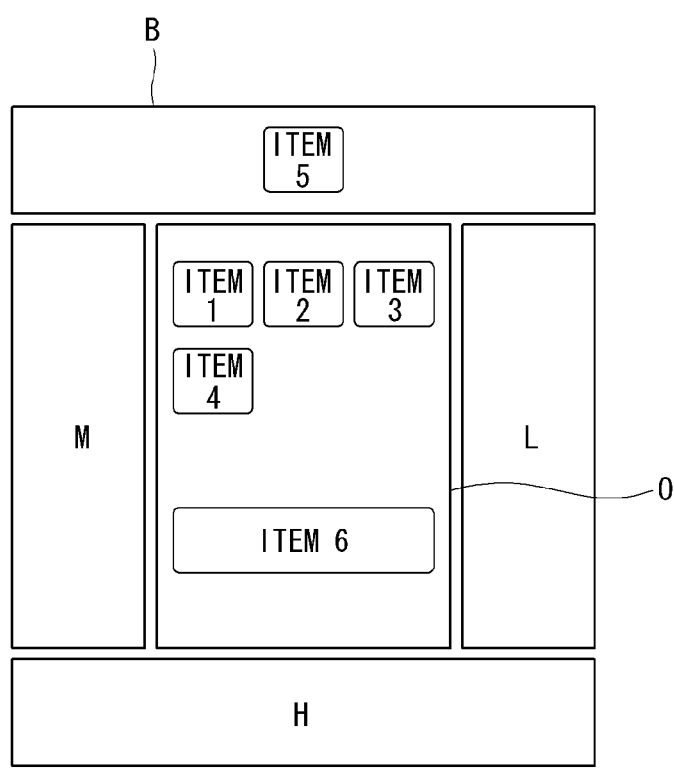

FIGS. 5 to 7 are views illustrating examples of using virtual areas of the mobile terminal as shown in FIG. 1.

Referring to FIGS. 5 to 7, the controller 180 of the mobile terminal 100 may perform an operation of moving a specific item into a virtual area in response to a user's touch input.

As shown in FIG. 5A, a user may select a specific item using his finger F.

As shown in FIG. 5B, the user may form a touch trajectory TF in a certain direction. For example, a touch operation of dragging the selected item upward may be performed.

As shown in FIG. 6, as the user's touch trajectory TF approaches an upper border which is an upper portion of the display 151, the controller 180 may expose part of a virtual area positioned along the direction to the user. For example, when the user's touch approaches the upper border, part of a preview area PV may be exposed. When the preview area PV is displayed, the user may visually identify, in advance, what attribute the virtual area corresponding to the dragged direction has. Accordingly, an unwanted virtual area may be previously prevented from being operated due to errors or malfunctions.

As shown in FIG. 7, the item selected and moved by the user may be located in a corresponding virtual area. The controller 180 may move ITEM5 selected by the user's touch operation from the current screen area to the buffer area B and display ITEM5 on the buffer area B.

The controller 180 may relocate ITEM6 in the buffer area B and may display part or whole of a virtual area including the buffer area B on the display 151. For example, it can be visually displayed in which virtual area an item is relocated.

Figure 8:
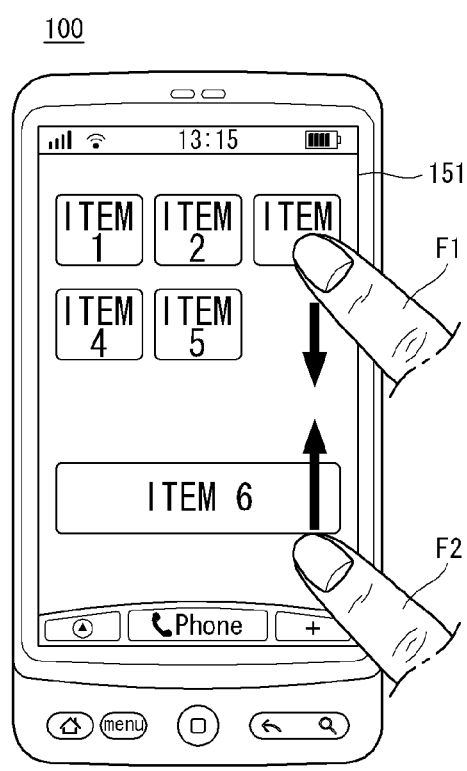
FIG. 8 is a view illustrating another example of initiating an editing mode by the mobile terminal as shown in FIG. 1.

FIG. 8 is a view illustrating another example of initiating an editing mode by the mobile terminal as shown in FIG. 1.

Referring to FIG. 8, the controller 180 of the mobile terminal 100 may initiate an editing mode upon a user's specific touch operation.

The user may touch the display 151 using his first and second fingers F1 and F2. The touch operation using the first and second fingers F1 and F2 may include a touch that has the first and second fingers F1 and F2 close to each other. Upon entry of a multi touch having the fingers F1 and F2 close to each other, the controller 180 may initiate an editing mode.

Figure 9:
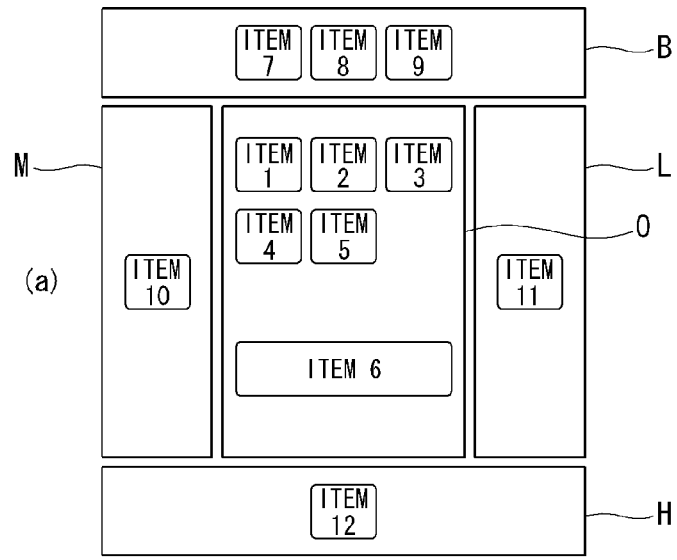
FIGS. 9 to 11 are views illustrating various exemplary virtual areas of the mobile terminal shown in FIG. 1.
Figure 9:
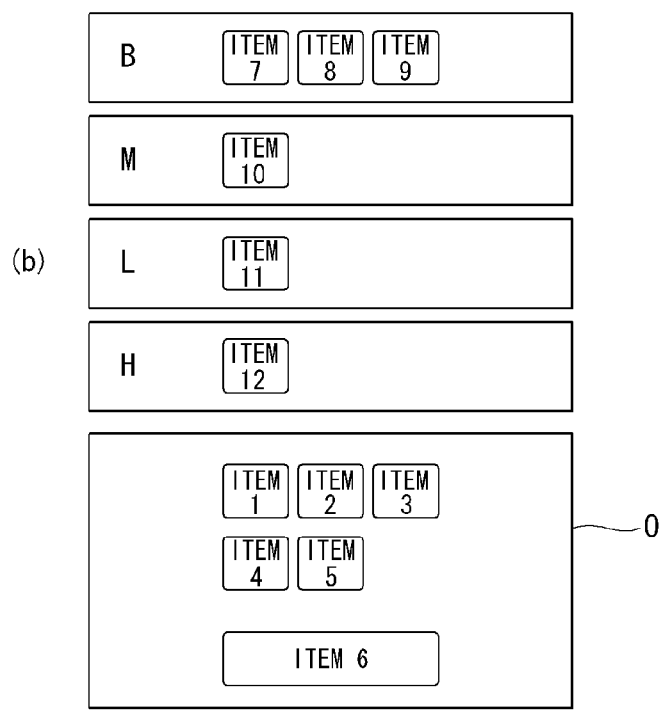
Figure 10:
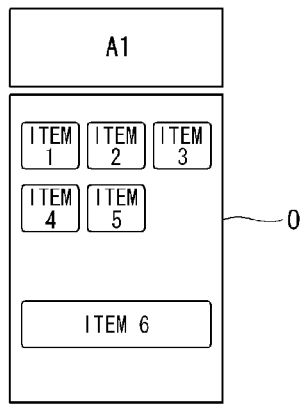
Figure 10:
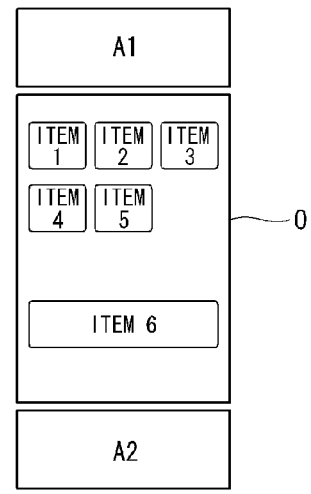
Figure 10:
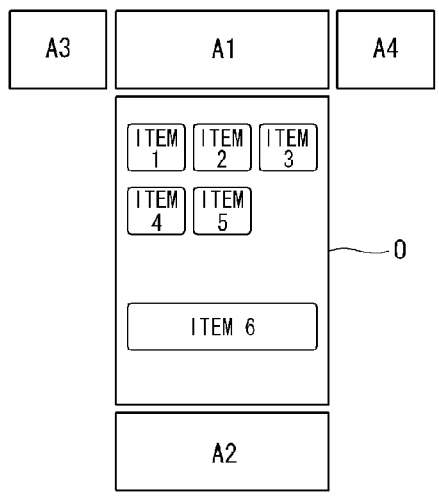
Figure 10:
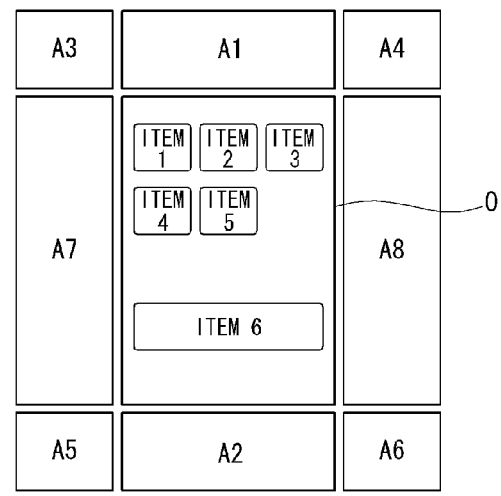
Figure 11:
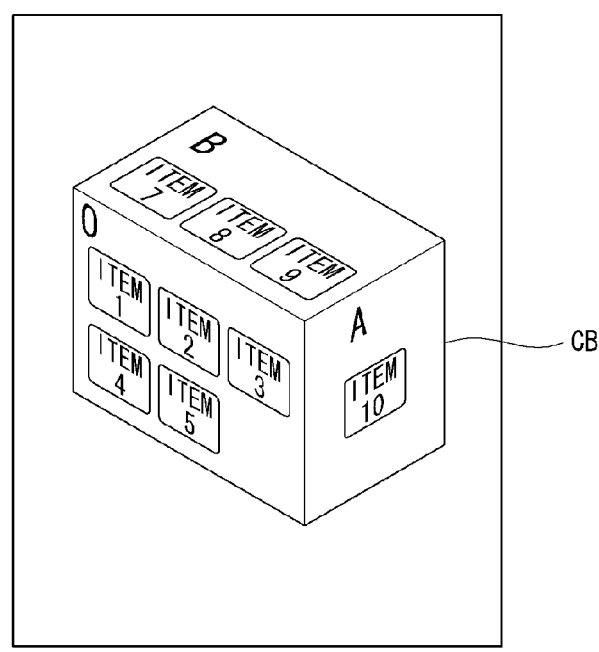

FIGS. 9 to 11 are views illustrating various exemplary virtual areas of the mobile terminal shown in FIG. 1.

As shown in FIGS. 9 to 11, the controller 180 of the mobile terminal 100 may set virtual areas by various methods.

As shown in FIG. 9A, virtual areas may be located surrounding a current screen area O.

As shown in FIG. 9B, virtual areas may be stacked over a current screen area O. For example, the current screen area O is located at a lowermost part, and a hidden area H, a lock screen area L, a management area M, and a buffer area B may be sequentially set over the current screen area O.

The controller 180 may selectively display the virtual areas. For example, while displaying the current screen area O under the current circumstance, the controller 180 may sequentially display the virtual areas.

As shown in FIG. 10A, a virtual area may be set to be located only over a current screen area O. For example, a first virtual area A1 may be set to be located over and adjacent to the current screen area O.

As shown in FIG. 10B, virtual areas may be respectively set to be located under and over a current screen area O. For example, first and second virtual areas A1 and A2 may be respectively set to be located over and under the current screen area O and adjacent to the current screen area O.

As shown in FIG. 10C, virtual areas may be set to be located over diagonal lines extending from a current screen area O. For example, in addition to the first and second virtual areas A1 and A2 as shown in FIG. 2B, third and fourth virtual areas A3 and A4 may be set to be located over diagonal lines extending from the current screen area O. In other words, the third and fourth virtual areas A3 and A4 may be positioned at left and right sides of the first virtual area A1.

As shown in FIG. 10D, virtual areas may be set to be located adjacent to and surrounding a current screen area O. For example, first to eighth virtual areas A1 to A8 may be set to be located adjacent to the current screen area O.

As shown in FIG. 11, virtual areas may be set to be located in a shape of a cube CB. For example, virtual areas may be set to be located on respective corresponding surfaces of the cube CB or located on some surfaces of the cube CB.

In response to a user's drag touch operation, the controller 180 may rotate the cube CB. A user may rotate the cube CB so that a desired surface is displayed. Further, the user may relocate an item from a surface of the cube CB to another surface of the cube CB.

Figure 12A:
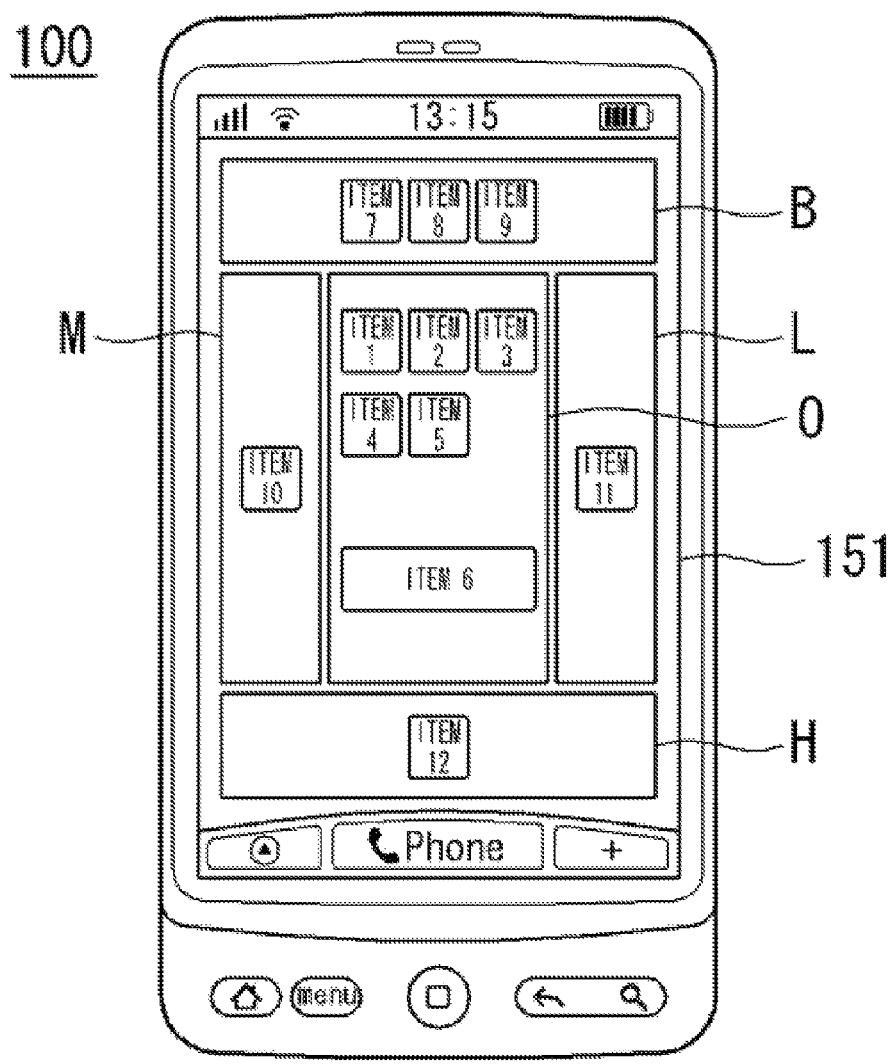
Figure 12B:
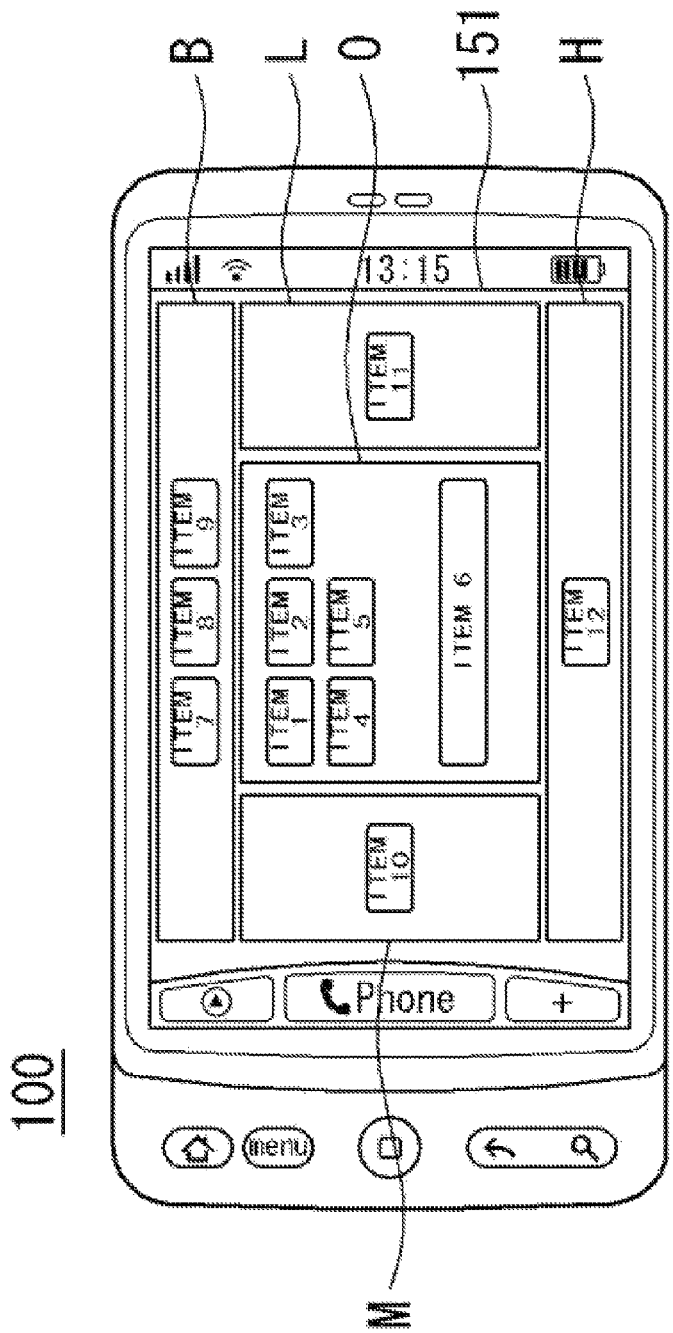
Figure 13:
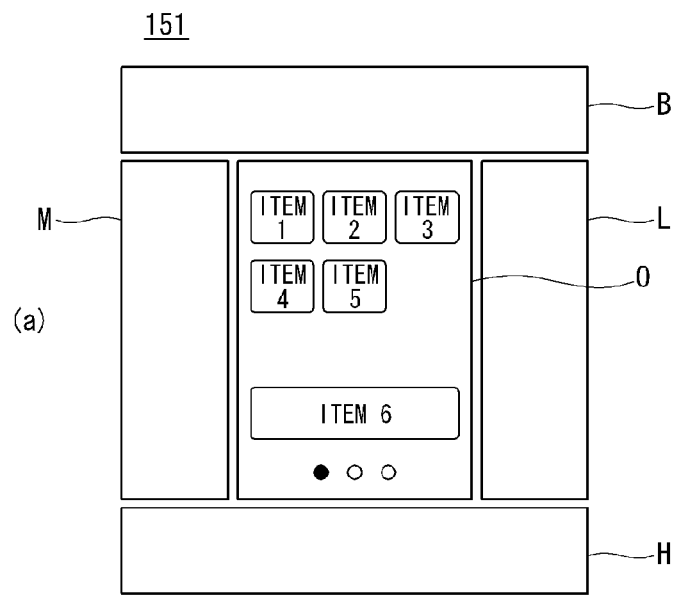
FIGS. 13 to 19 are views illustrating operations of buffer areas of the mobile terminal shown in FIG. 1.
Figure 13:
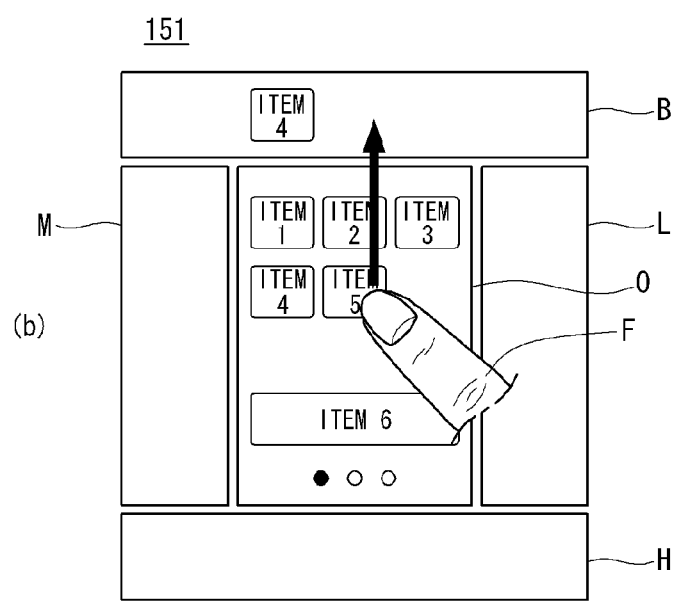
Figure 14:
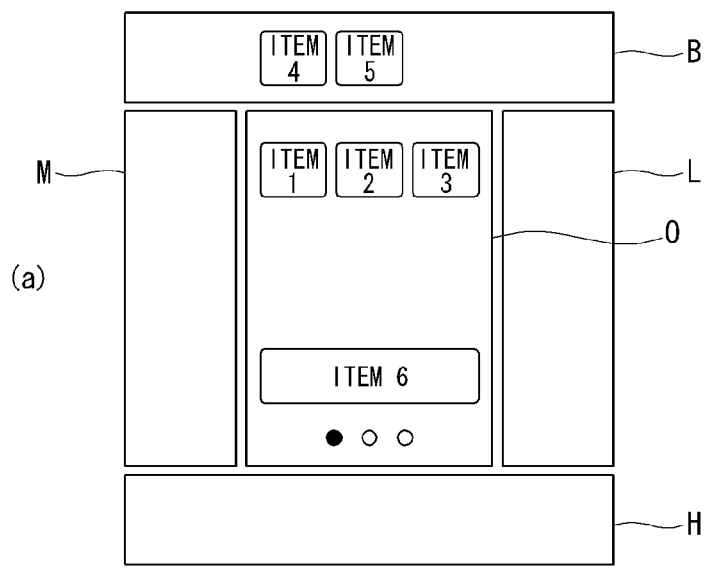
Figure 14:
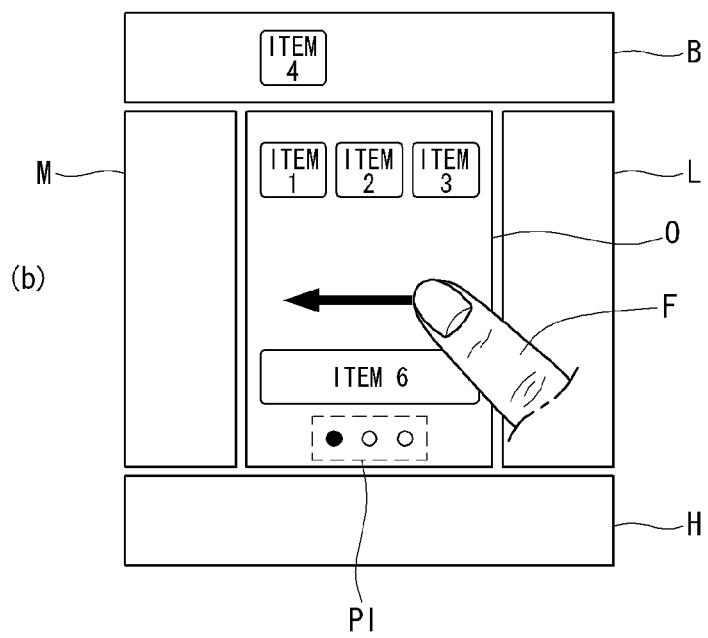
Figure 15:
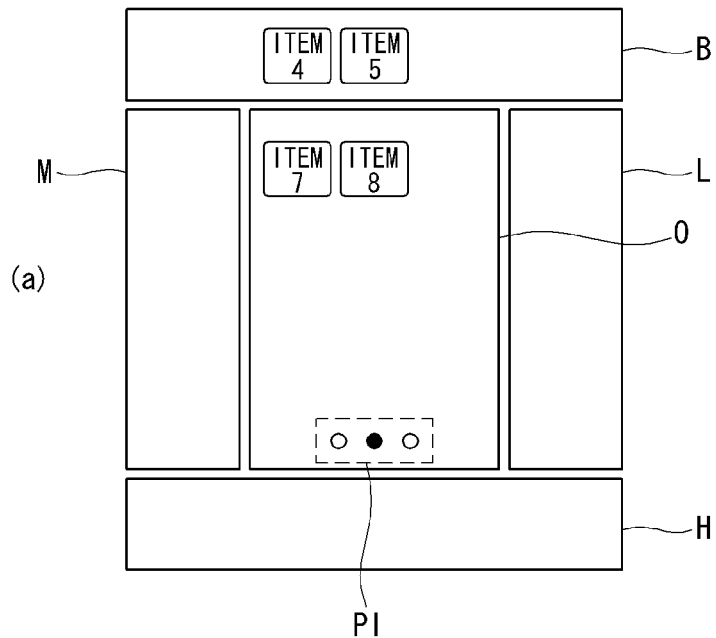
Figure 15:
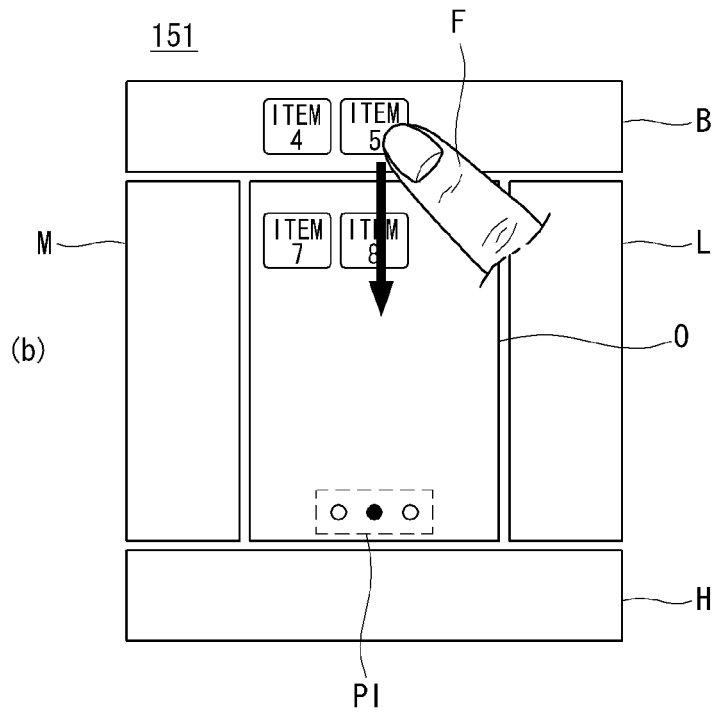

FIGS. 12A and 12B are views illustrating arrangements of virtual areas as the mobile terminal shown in FIG. 1 rotates.

Referring to FIG. 12, the controller 180 of the mobile terminal 100 may adjust the locations of the virtual areas depending on a rotational direction of the mobile terminal 100.

As shown in FIG. 12A, when the mobile terminal 100 stays upright, the controller 180 may respectively set a buffer area, a hidden area H, a lock screen area L, and a management area M at an upper side, a lower side, a right side, and a left side of a current screen area O.

The arrangement of the virtual areas may be pre-set or properly adjusted by a user.

As shown in FIG. 12B, when the mobile terminal 100 lies down, the controller 180 may maintain the locations of the virtual areas when the mobile terminal 100 stays upright. For example, irrespective of the rotation of the mobile terminal 100, the virtual areas may be positioned at predetermined locations, respectively.

As shown in FIG. 12C, when the mobile terminal 100 lies down, the controller 180 may rotate the locations of the virtual areas to correspond to the direction of the rotation of the 100. For example, when the mobile terminal 100 rotates clockwise, the virtual areas may also rotate sequentially clockwise.

FIGS. 13 to 19 are views illustrating operations of buffer areas of the mobile terminal shown in FIG. 1.

Referring to FIGS. 13 to 19, the controller 180 of the mobile terminal 100 may perform an operation corresponding to a user's touch on a set buffer area B.

As shown in FIG. 13A, the display 151 may display a current screen area O and virtual areas B, L, H, and M. The virtual areas B, L, H, and M may be displayed on the display 151 together with the current screen area O. Alternatively, some of the virtual areas B, L, H, and M may be displayed together with the current screen area O or only certain parts of the virtual areas B, L, H, and M may be displayed.

As shown in FIG. 13B, a user may perform a touch operation of touching a specific item using his finger F and dragging the item into the buffer area B. The user may drag a plurality of items one by one or may select and drag the plurality of items at once.

As shown in FIG. 14A, the moved items may be located in the buffer area B.

As shown in FIG. 14B, the user may perform a touch operation of dragging a current screen area O in a left direction. The touch operation of dragging the current screen area O in the left direction may correspond to a function of shifting the current screen area O to another background screen.

As shown in FIG. 15A, a background screen of another page may be displayed on a current screen area O of the display 151. This may be intuitively recognized by a page indicator PI indicating at what position the background screen being currently displayed is located among a plurality of background screens.

As shown in FIG. 15B, a user may select a desired item of items relocated in the buffer area B and drag the selected item into the current screen area O.

Figure 16:
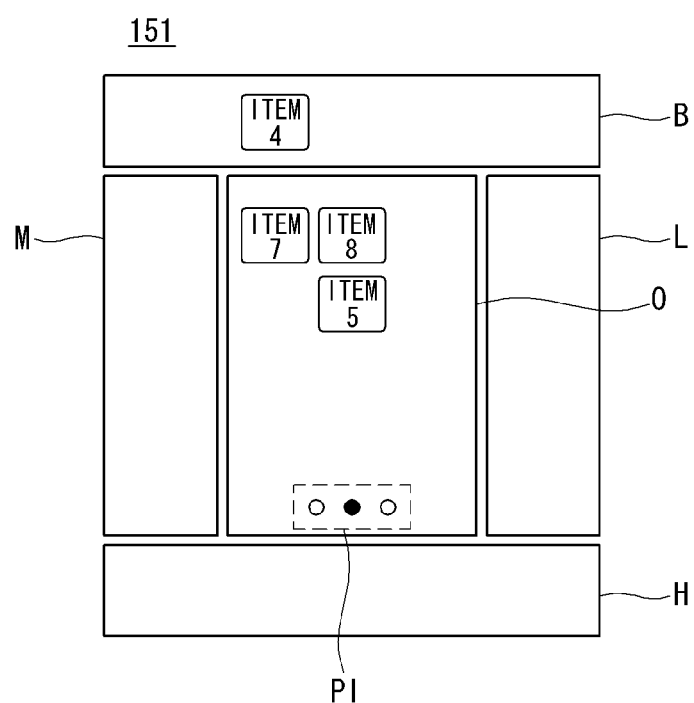
Figure 17:
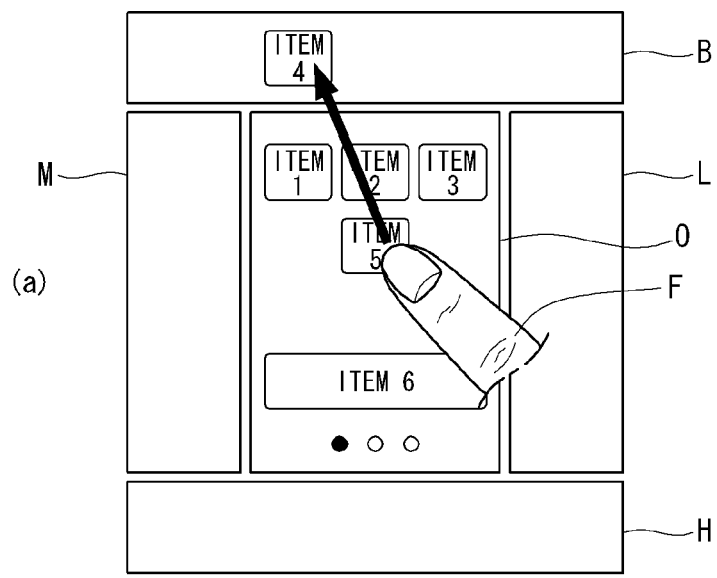
Figure 17:
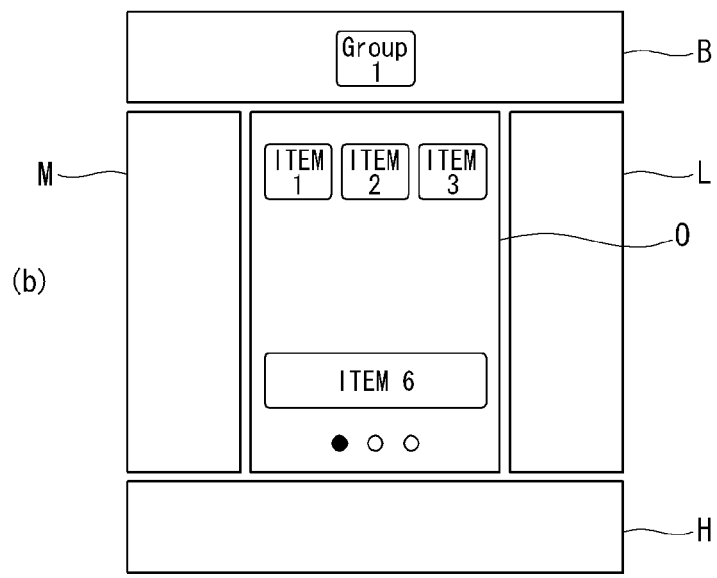
Figure 18:
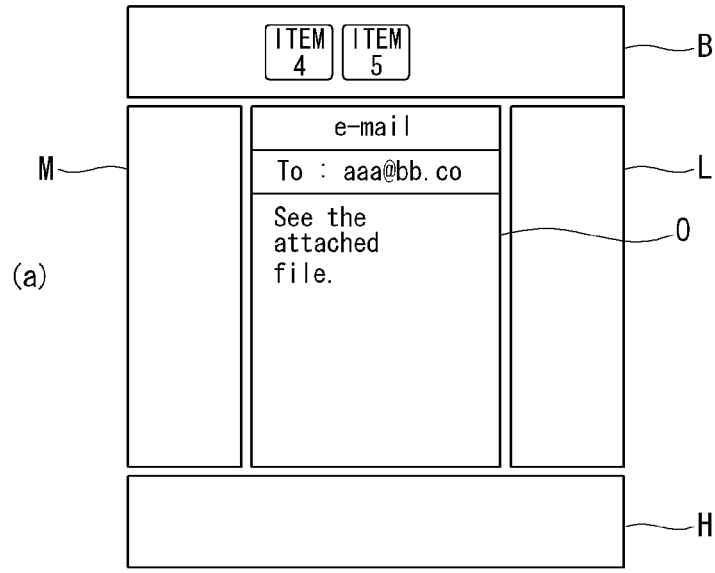
Figure 18:
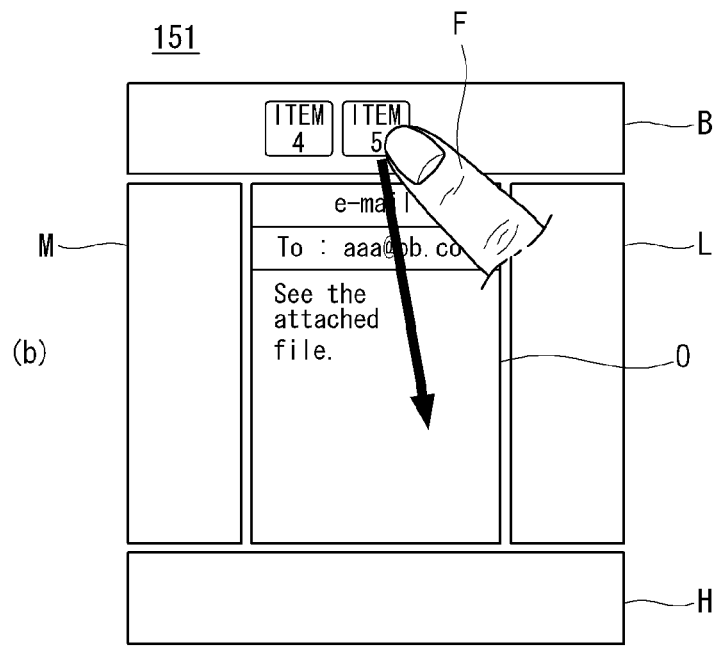

As shown in FIG. 16, the item dragged by the user may be relocated in the current screen area O and displayed.

Applying a method of temporarily moving an item in the buffer area and then relocating into a desired page may reduce a chance of malfunction and increase convenience in manipulation compared to the prior art of moving items one by one.

As shown in FIG. 17A, another item may be dragged to overlap the item located in the buffer area B. For example, a user may perform a touch operation of dragging and dropping ITEM5 on ITEM4 located in the buffer area B.

As shown in FIG. 17B, when a drag is performed to overlap items, the overlapping items may generate a group or a folder. The name of the generated group may vary with attributes of the overlapping items.

As shown in FIG. 18A, items selected and relocated by a user may be positioned in the buffer area B. An email application may be executed in the current screen area O.

As shown in FIG. 18B, a user may perform a touch operation of selecting a specific item among items in the buffer area B and dragging and dropping the selected item in the current screen area O.

Figure 19:
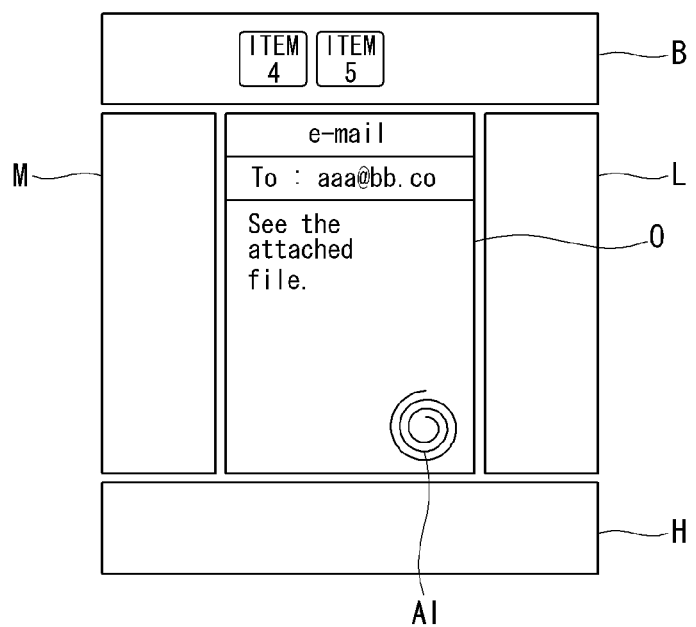

As shown in FIG. 19, when the user selects the specific item and drags and drops the selected item in the current screen area, the item may become an attached file A1 for an email.

The application executed in the current screen area O may be a picture view application, so that when an item in the buffer area B is dragged and dropped in the current screen area O, the item may be viewed by the picture view application.

The application executed in the current screen area O may be an mp3 player application, so that when an item in the buffer area B is dragged and dropped in the current screen area O, the item may be played by the mp3 player application.

By dragging and dropping an item from the buffer area B to the current screen area O, an operation associated with a specific application may be performed thus providing convenience of manipulation, such as attaching files.

FIGS. 20 to 24 are view illustrating operation of a management area of the mobile terminal shown in FIG. 1.

Referring to FIGS. 20 to 24, the controller 180 of the mobile terminal 100 may effectively manage, for example, background screens through the management area M.

Figure 20:
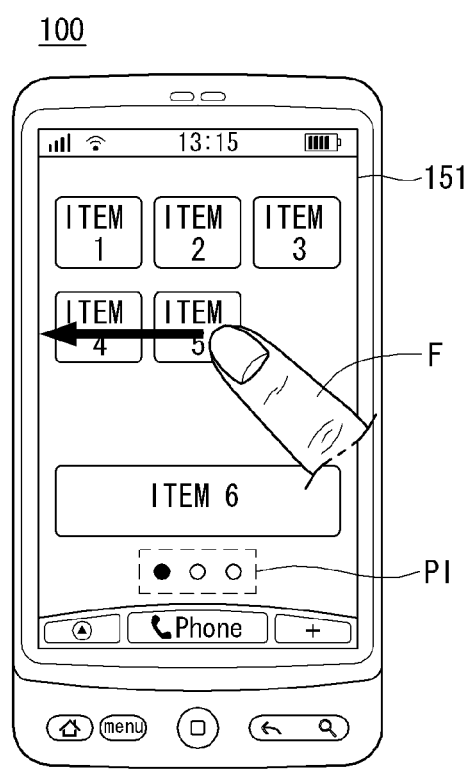
FIGS. 20 to 24 are view illustrating operation of a management area of the mobile terminal shown in FIG. 1.

As shown in FIG. 20, a user may perform a drag touch operation of selecting a specific item and moving the selected item leftward.

Figure 21:
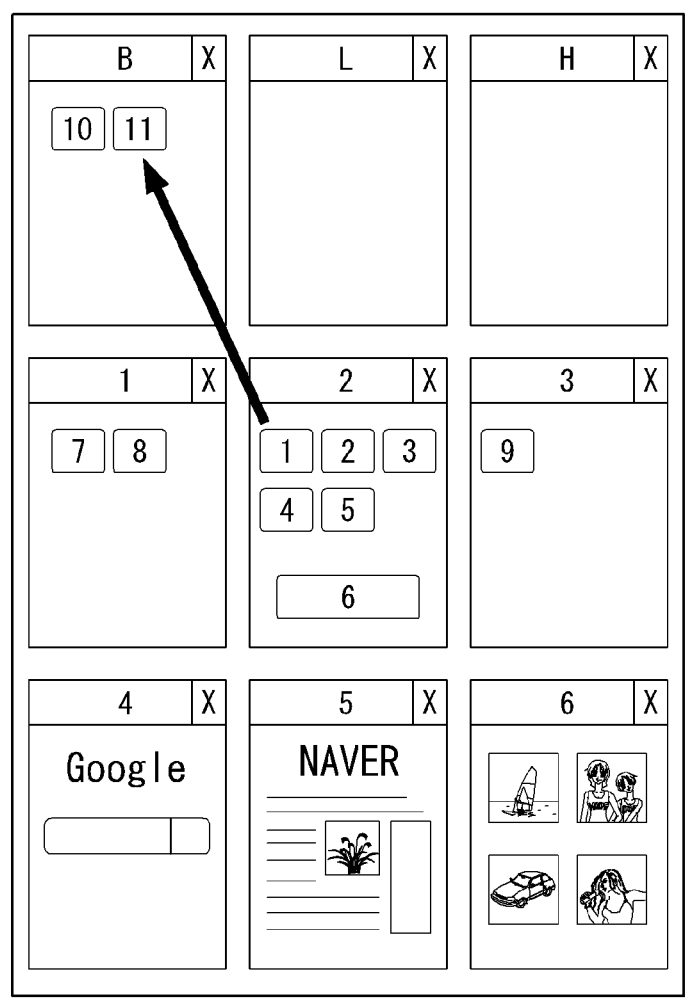

As shown in FIG. 21, when the user's drag touch operation is performed, the controller 180 may display the management area M on the display 151.

The management area M may be an area for displaying each background screen and/or each application in execution of the mobile terminal 100. Each background screen and/or each application in execution may be displayed in the shape of panels.

The management area M may display a current state of the virtual areas. For example, the management area M may display what items are located in the buffer area B, lock screen area L, and hidden area H.

The management area M may display states of background screens as set, such as background screens 1 to 3. For example, the management area M may display that items 7 and 8 are located in the background 1.

The management area M may display current states of applications in execution, such as applications 4 to 6. For example, the management area M may display that the applications 4 and 5 in execution are web surfing applications and the application 6 in execution is a picture view application.

A user may relocate an item from a specific location to another location in the management area M. For example, the user may move the item 1 from the background screen 2 into the buffer area B by a drag and drop touch operation.

Figure 22:
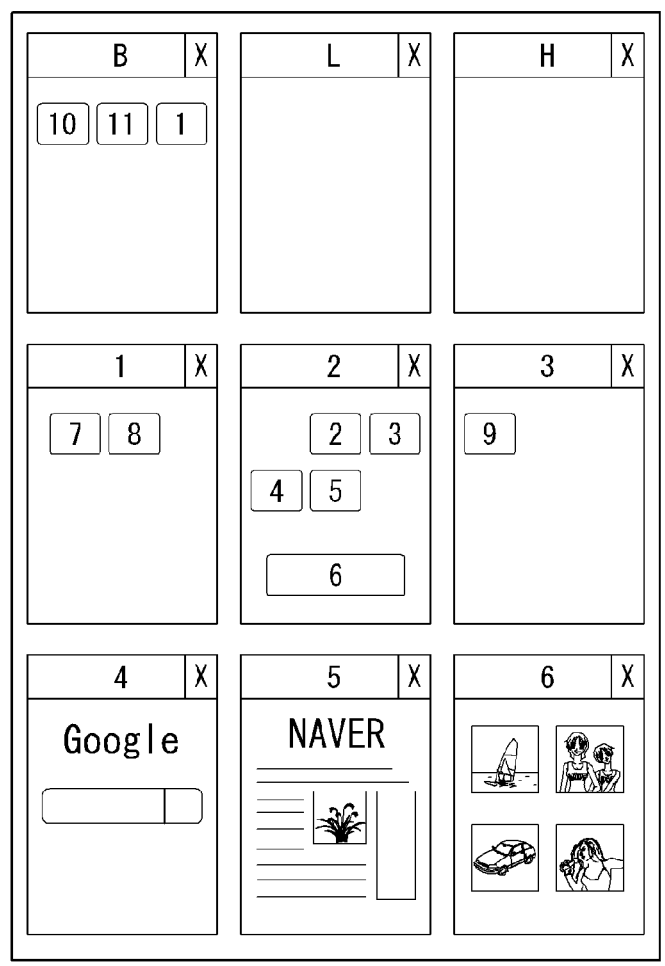

As shown in FIG. 22, it can be seen that the item 1 has been relocated into the buffer area B by the user performing the drag and drop touch operation on the item 1.

Figure 23:
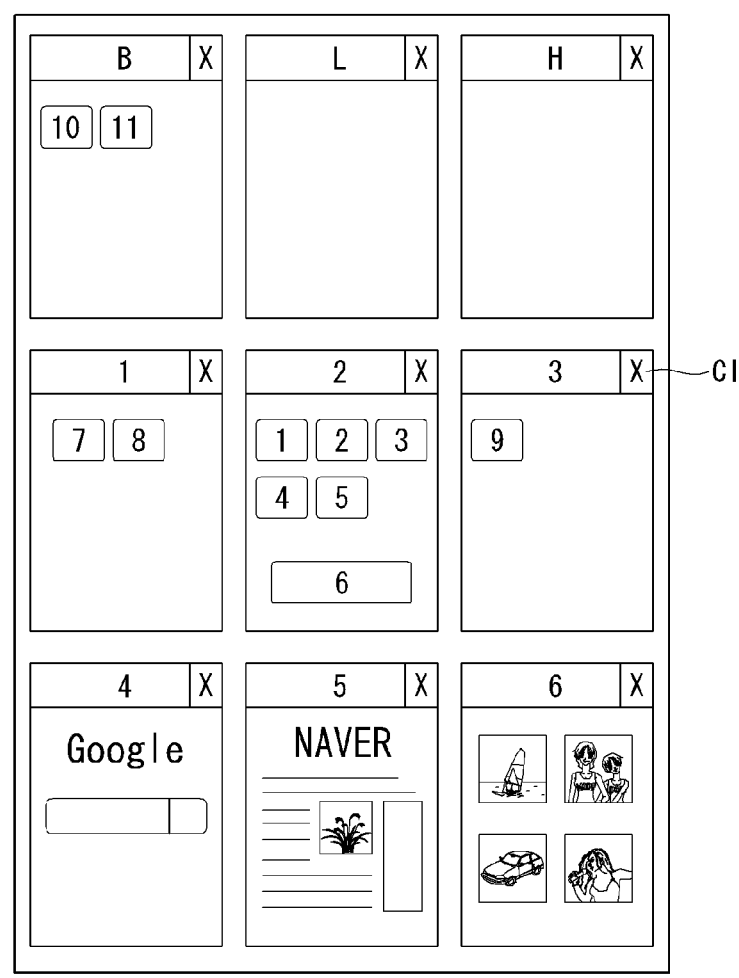

As shown in FIG. 23, each panel in the management area M may display a delete button CI. A panel may be deleted by a user selecting the corresponding delete button CI.

Figure 24:
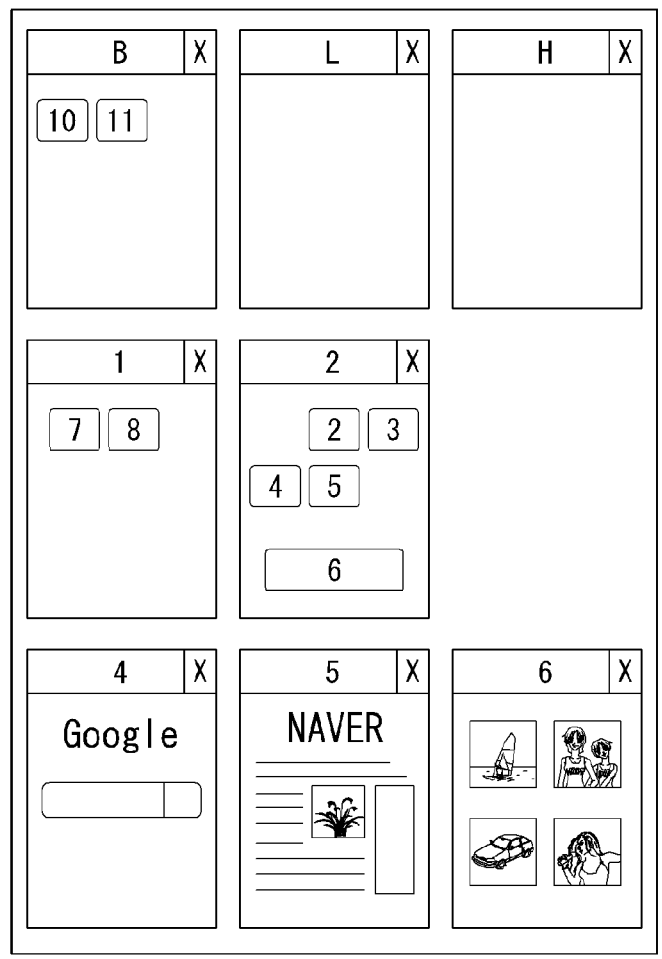

As shown in FIG. 24, by the user selecting the delete button CI of the background screen 3, the background screen 3 may be deleted.

The user may delete not only each panel but also each item. For example, by the user performing a long touch on a specific item, the item may be deleted or a menu for deleting the item may be popped up.

Figure 25:
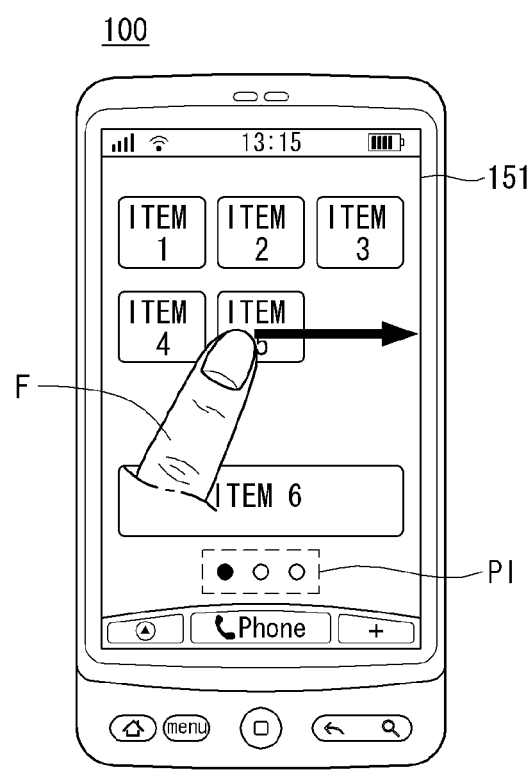
FIGS. 25 to 27 are views illustrating operations of a lock screen area of the mobile terminal shown in FIG. 1.
Figure 26:
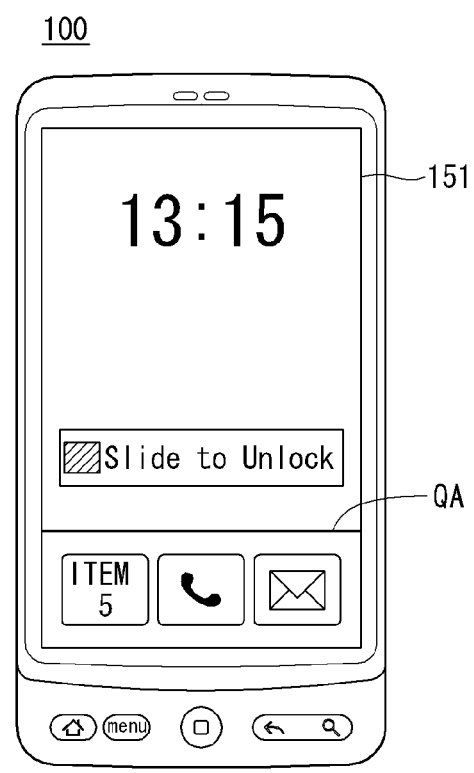
Figure 27:
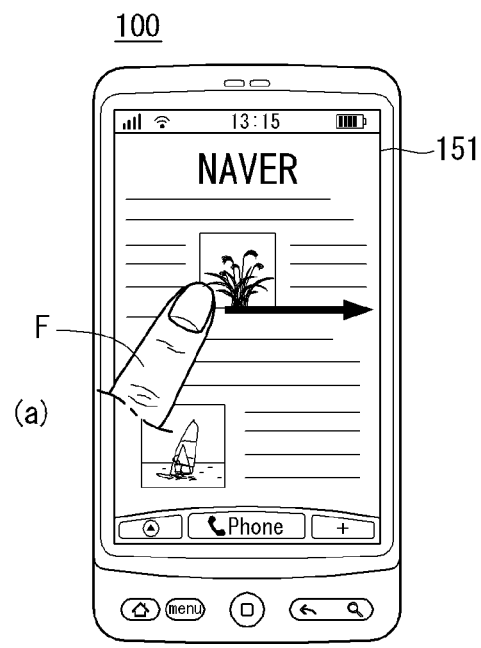
Figure 27:
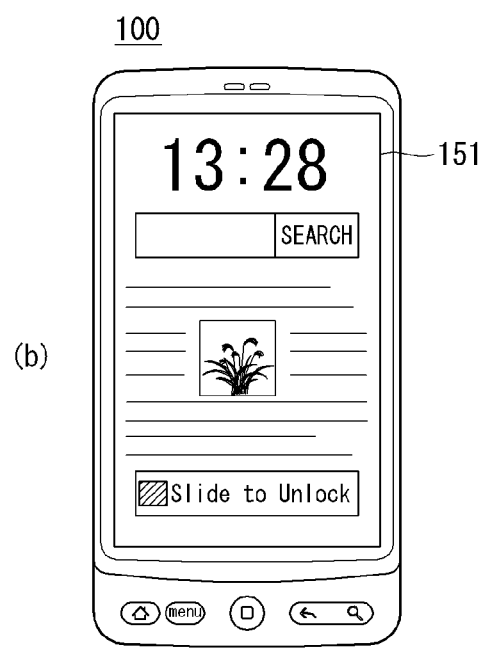

FIGS. 25 to 27 are views illustrating operations of a lock screen area of the mobile terminal shown in FIG. 1.

Referring to FIGS. 25 to 27, the controller 180 of the mobile terminal 100 may select items to be displayed on a lock screen through the lock screen area L.

As shown in FIG. 25, a user may perform an operation of selecting a specific item and dragging the selected item rightwards.

As shown in FIG. 26, when the mobile terminal 100 is locked, an item ITEM5 selected by the user may be arranged on the display 151.

In the case of the item ITEM5, the controller 180 may enable the item ITEM5 to be executed immediately when the user selects the item ITEM5 irrespective of whether the mobile terminal 100 is locked. For example, a process of selecting the item ITEM5 after the mobile terminal is unlocked may be omitted.

As shown in FIG. 27A, a specific application may be in execution. For example, an application for web surfing may be executed. While the application is in execution, a user may relocate the application into a lock screen area L by performing a touch operation of dragging the application in the right direction of the display 151 using his finger F.

As shown in FIG. 27B, the application relocated in the lock screen may be displayed as a background screen of the lock screen. When the mobile terminal is unlocked, the application may be executed.

It can be easily performed to set the lock screen by displaying an application being currently executed as a background screen of the lock screen without additional operations and by executing the application when the mobile terminal is unlocked.

Figure 28:
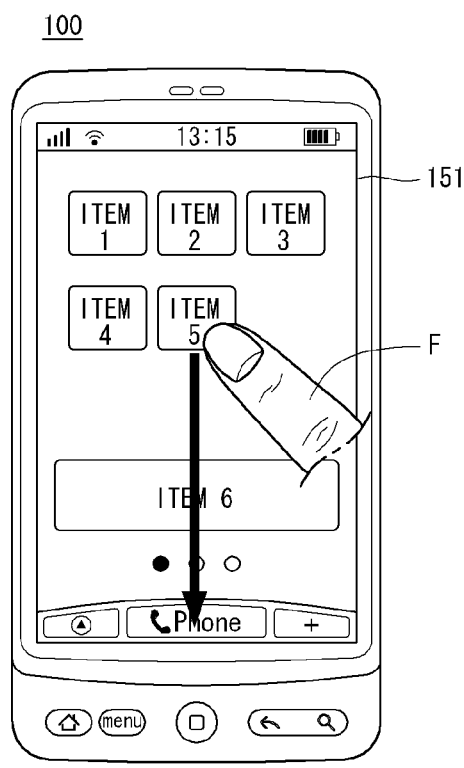
FIGS. 28 to 30 are views illustrating operations of a hidden area of the mobile terminal shown in FIG. 1.
Figure 29:
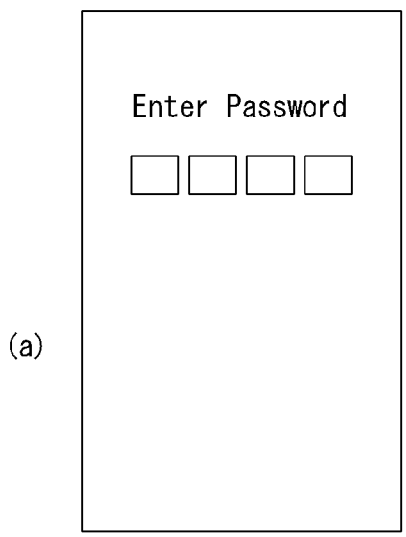
Figure 29:
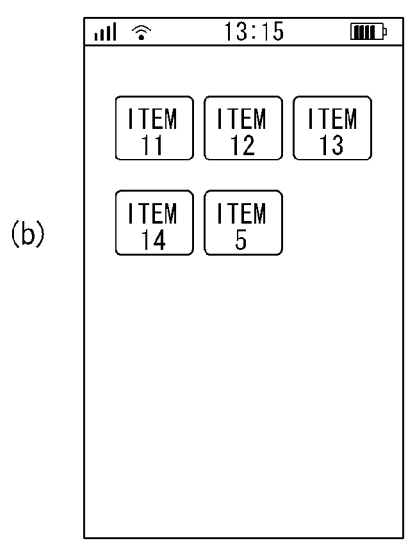
Figure 30:
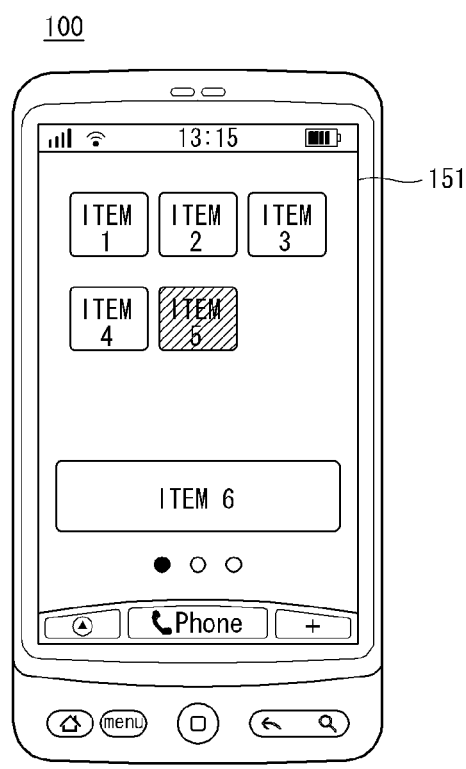

FIGS. 28 to 30 are views illustrating operations of a hidden area of the mobile terminal shown in FIG. 1.

Referring to FIGS. 28 to 30, the controller 180 of the mobile terminal 100 may perform a touch operation of selecting a specific item and dragging the selected item in a hidden area H which is located at a lower portion of the display 151, and may restrict access to the specific item.

As shown in FIG. 29A, a password may need to be entered to enter into the hidden area H, and only when a right password is entered, the hidden area H may be allowed to access.

As shown in FIG. 29B, only when the hidden area is allowed to access, the items in the hidden area H may be displayed.

As shown in FIG. 30, the controller 180 may restrict access to a specific item relocated in the hidden area. For example, to visually express that the specific item relocated in the hidden area has been inactivated, the controller 180 may add hatching to ITEM5. According to an embodiment, the controller 180 may delete the specific item relocated in the hidden area from the display 151.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a display unit configured to display one or more items; and
a controller configured to control the display unit to:
display the one or more items;
set one or more virtual areas on the display unit, the one or more virtual areas having different attributes for editing at least one item;
select a particular item from the one or more displayed items;
relocate the selected particular item to a particular virtual area of the one or more virtual areas; and
change the selected particular item according to an attribute of the particular virtual area.

2. The mobile terminal of claim 1, wherein the controller is further configured to control the display unit to set a plurality of virtual areas having different attributes from each other in different locations adjacent to a display area of the display unit.

3. The mobile terminal of claim 2, wherein the plurality of virtual areas include a buffer area having an attribute of temporarily storing the selected particular item, a management area having an attribute of managing the selected particular, a lock screen area having an attribute of relocating the selected particular item to a lock screen and displaying the relocated particular item, and a hidden area having an attribute of selectively restricting access to the selected particular item.

4. The mobile terminal of claim 2, wherein the display area has a substantially rectangular shape and the different locations include at least two of an upper portion, a lower portion, a left portion, a right portion, and a corner portion of the display area.

5. The mobile terminal of claim 1, wherein the controller is further configured to:
   select the particular item from the one or more displayed items according to a touch input; and
   relocate the selected particular item to the particular virtual area corresponding to a direction of a drag of the touch input.

6. The mobile terminal of claim 1, wherein the controller is further configured to control the display unit to set the one or more virtual areas when an editing mode is initiated in response to a touch input.

7. The mobile terminal of claim 1, wherein the controller is further configured to control the display unit to display at least a predetermined number of virtual areas of the one or more virtual areas that are adjacent to a border of a display area of the display unit when a trajectory of a drag of the selected particular item approaches the border.

8. The mobile terminal of claim 1, wherein the controller is further configured to control the display unit to change locations of the one or more virtual areas according to a rotational direction of the mobile terminal.

9. The mobile terminal of claim 1, wherein:
   the one or more virtual areas include a buffer area having an attribute of temporarily storing the selected particular item; and
   the controller is further configured to control the display unit to:
   relocate the selected particular item from a first background screen to the buffer area; and
   relocate the selected particular item from the buffer area to a second background screen in response to a received touch input and display the relocated particular item.

10. The mobile terminal of claim 1, wherein:
    the one or more virtual areas include a buffer area having an attribute of temporarily storing the selected particular item; and
    the controller is further configured to control the display unit to relocate the selected particular item to the buffer area and associate the selected particular item with an operation of an application being executed in a display area of the display unit in response to a received touch input.

11. The mobile terminal of claim 1, wherein:
    the one or more virtual areas include a lock screen area having an attribute of relocating the selected particular item to a lock screen and displaying the relocated particular item; and
    the controller is further configured to control the display unit to relocate and execute the selected particular item irrespective of whether the mobile terminal is locked.

12. The mobile terminal of claim 1, wherein:
    the one or more virtual areas include a lock screen area having an attribute of relocating the selected particular item into a lock screen and displaying the relocated particular item; and
    the controller is further configured to execute the relocated particular item when the mobile terminal is unlocked.

13. The mobile terminal of claim 1, wherein the controller is configured to:
    change a display area of the selected particular item to the particular virtual area; and
    display the selected particular item on the particular virtual area.

14. The mobile terminal of claim 1, wherein the controller is configured to:
    change a shape of the selected particular item to a folder comprising the selected particular item.

15. The mobile terminal of claim 1, wherein the controller is further configured to display the one or more virtual areas adjacent to the selected particular item.

16. A method of controlling a mobile, the method comprising:
    displaying one or more items;
    setting one or more virtual areas, the one or more virtual areas having different attributes for editing at least one item;
    selecting a particular item from the one or more displayed items;
    relocating the selected particular item to a particular virtual area of the one or more virtual areas; and
    changing the selected particular item according to an attribute of the particular virtual area.

17. The method of claim 16, wherein the plurality of virtual areas include a buffer area having an attribute of temporarily storing the selected particular item, a management area having an attribute of managing the selected particular item, a lock screen area having an attribute of relocating the selected particular item to a lock screen and displaying the relocated particular item, and a hidden area having an attribute of selectively restricting access to the selected particular item.

18. The method of claim 16,
    wherein the particular item is selected from the one or more displayed items according to a touch input; and
    the selected particular item is relocated to the particular virtual area corresponding to a direction of a drag of the touch input.

19. The method of claim 16, further comprising:
    displaying at least a predetermined number of virtual areas of the one or more virtual areas that are adjacent to a border of a display area of a display unit when a trajectory of a drag of the selected particular item approaches the border.

20. The method of claim 16, further comprising changing locations of the one or more virtual areas according to a rotational direction of the mobile terminal.

21. The method of claim 16, further comprising setting a plurality of virtual areas having different attributes from each other in different locations adjacent to a display area of a display unit.

22. The method of claim 16, further comprising setting the one or more virtual areas when an editing mode is initiated in response to a touch input.

23. The method of claim 16, wherein
    a display area of a display unit has a substantially rectangular shape;
    a plurality of virtual areas having different attributes from each other are set in different locations adjacent to the display area; and
    the different locations include at least two of an upper portion, a lower portion, a left portion, a right portion, and a corner portion of the display area.

24. The method of claim 16, wherein the changing the selected particular item comprises:

changing a display area of the selected particular item to the particular virtual area; and displaying the selected particular item on the particular virtual area.

25. The method of claim 16, wherein changing the selected particular item comprises:

changing a shape of the selected particular item to a folder comprising the selected particular item.

26. The method of claim 16, further comprising:

displaying the one or more virtual areas adjacent to the selected particular item.

* * * * *